2,849,401
DIAMIDO ACID SALT GREASE THICKENERS

Bruce W. Hotten, Orinda, Calif., assignor to California Research Corporation, San Francisco, Calif., a corporation of Delaware No Drawing. Application December 31, 1953
Serial No. 401,698

16 Claims. (Cl. 252—33.6)

This invention pertains to new grease-thickening agents for the preparation of high water-resistant grease compositions.

Lubrication engineers are constantly on the search for water-resistant grease compositions having high melting points, and which are also resistant to oxidation. In the past, highly water-resistant grease compositions have been obtained by using, for example, calcium soaps of fatty acids as thickeners in grease compositions. However, such grease-thickening agents become oxidized and the greases eventually become broken down and flow from the parts being lubricated.

Some degree of satisfaction has been obtained in the preparation of greases containing lithium soaps of fatty acids as thickening agents. However, such lithium greases usually are expensive for many of the uses, and, also, they are less resistant to oxidation than is required in a number of phases of lubrication.

Numerous other grease thickeners which have been heretofore proposed are disadvantageous in that they may improve one property of a grease at the expense of other desirable properties, or they are insufficiently effective to be commercially satisfactory, or they are too expensive for general use. For example, certain greases suffer from hardening on aging and/or deteriorate in the presence of water. Still others become fluid in bearing tests.

The lubrication industry has long realized that it would be highly acceptable to obtain one grease composition embodying the combined characteristics of high melting point, high water resistance, and good resistance to oxidation. It is extremely advantageous to be able to use grease compositions which have these combined characteristics, eliminating the constant turmoil existing in the supplying of great numbers of greases for all the numbers of greases for all the numerous specified uses. Heretofore, it has been a problem in the lubrication industry to prepare lubricants which are particularly suitable to certain specific jobs. For example, high melting point lubricants, e. g., high dropping point greases, are used for lubricating automotive wheel bearings, steel mill equipment, high speed motors, universal joints, rocker arms of airplane motors, etc.; while highly water-resistant lubricants (e. g., greases characterized by low solubility and low emulsibility in water) are used for lubricating water pumps, automotive motor chassis, valves, etc.

By the use of the grease compositions of this invention, it is possible to eliminate a number of specific greases for the above exemplified uses. Because the grease compositions of the present invention have the combined characteristics of high water resistance, high melting point, and resistance to oxidation, these greases have a wide variety of applications, particularly where both water and high temperatures are encountered, such as in steel mill rollers and transfer table bearings, paper mill roller bearings, automotive wheel bearings under winter and flood conditions, including use in amphibious military vehicles, high temperature cannery equipment, exposed control surface bearings for aircraft, etc.

The grease compositions of the present invention are particularly useful where there is a danger of water coming in contact with the parts being lubricated and where the high temperatures serve as catalysts for the oxidation of the greases.

The term "high melting point" as used herein means melting points from 300° F. and 400° F., and even as high as 500° F. or higher. Numerous military and industrial grease specifications describe greases having minimum dropping points of 400° F., while at the same time being highly resistant to emulsification in water and resistant to oxidation.

According to the present invention, it has been found that oxidation-resistant, water-resistant, and high melting point greases may be obtained by the use of the new compounds, metal salts of diamido acids, as thickening agents for lubricating oils.

The diamido acids salts are prepared by first reacting a diamine with a monobasic acid to form the corresponding acid amide. The resulting acid amide is reacted with a dibasic acid to form the corresponding diamido acid, which is then reacted with a metal basic substance to form the metal salt thereof. These reactions are illustrated by the following equations:

(1) 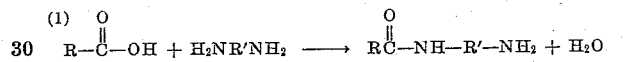

(2) 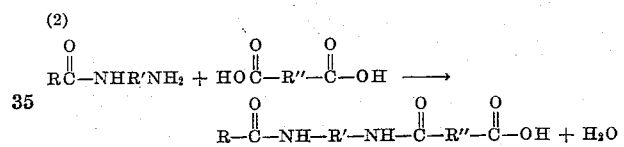

(3) 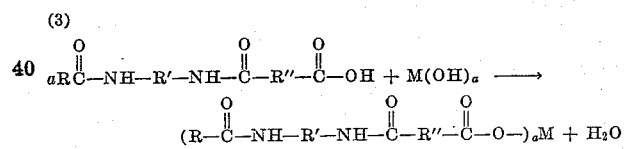

wherein R is a saturated or unsaturated, straight-chain or branched-chain hydrocarbon radical; R' is a saturated or unsaturated, straight-chain, branched-chain, or cyclic hydrocarbon radical; R" is a saturated or unsaturated, straight-chain, branched-chain or cyclic hydrocarbon radical; M is a metal; and $a$ is a number equal to the valence of the metal M.

When the metal salts of diamido acids are used as grease thickeners, it is preferred that R contain from 10 to 22 carbon atoms; that R' contain from 0 to 16 carbon atoms, and that R" contain from 1 to 8 carbon atoms.

As grease-thickening agents, it is especially preferred that R be a straight-chain or branched-chain radical having from 12 to 18 carbon atoms, R' be a straight-chain, substantially hydrocarbonaceous radical containing from 4 to 10 carbon atoms, R" be a straight-chain, substantially hydrocarbonaceous radical containing from 2 to 6 carbon atoms, $a$ has a value of 1, and that M be an alkali metal.

The metals which can be used in the formation of the thickening agents of this invention include the metals of Groups I, II, III and IV of Mendeleeff's Periodic Table. Preferred metals include lithium, sodium, potassium, barium, magnesium, calcium, zinc, strontium, cadmium, aluminum and lead; and those metals particularly preferred include lithium, sodium, and barium.

Examples of the R radicals include decyl, decenyl, dodecyl, dodecenyl, tetradecyl, tetradecenyl, hexadecyl, octadecyl, radicals derived from petroleum hydrocarbons, such as olefin polymers, e. g., polypropylene and polybutylene, etc.

Examples of R' radicals include methylene radicals, i. e., $(CH_2)_x$, wherein $x$ is a number from 0 to 16 (4 to 10 being preferred); including methylene radicals which may have one or more saturated or unsaturated straight-chain, branched-chain or cyclic essentially hydrocarbonaceous radical attached thereto; etc.

Examples of R'' radicals include methylene radicals, i. e., $(CH_2)_x$, wherein $x$ is a number from 1–8 (2 to 6 being preferred).

Examples of dibasic acids from which the R'' radical is obtained include oxalic acid, malonic acid, methyl malonic acid, succinic acid, methyl succinic acid, adipic acid, pimelic acid, suberic acid, azelaic acid, sebacic acid, terephthalic acid, isophthalic acid, etc.

In the preparation of grease compositions of this invention, other dibasic acids which can be used include those which are known as dimer acids, which are obtained from Emery Industries, Inc., Cincinnati, Ohio. These dibasic acid preparations contain a small amount of tricarboxylic acids (approximately 12%), which also form grease thickening agents when reacted according to the present invention.

The diamines used in the preparation of the thickening agents herein include hydrazine, ethylene diamine, ethane diamine-1,2; propane diamine-1,2; propane diamine-1,3; butane diamine-1,2; butane diamine-1,3; butane diamine-1,4; pentane diamine-1,2; pentane diamine-1,3; pentane diamine-1,5; hexamethylene diamine; hexane diamine-1,2; hexane-1,3 diamine; octamethylene diamine; tetradecane diamine; hexadecane diamine; p-xylylene diamine; etc.

For purposes of simplification, the diamido acid salts herein, with the exception of the diamido acid salts which are formed when hydrazine is the diamine, can be termed, "N-acyl, N'-acyl-alkylene diamine." Examples of the thickening agents herein include the metal salts of N-lauroyl, N'-adipoyl, ethylene diamine; N-stearoyl, N'-adipoyl, propylene diamine; N-stearoyl, N'-sebacoyl, tetramethylene diamine; N-decanoyl, N'-sebacoyl, hexamethylene diamine; N-lauroyl, N'-terephthaloyl, hexamethylene diamine, N-eicosoyl, N'-azelaoyl, hexadecamethylene diamine; N-stearoyl, N'-malonoyl, xylylene diamine; etc.

Lubricating oils which are suitable base oils for the grease compositions of this invention include a wide variety of lubricating oils, such as naphthenic base, paraffin base, and mixed base, other hydrocarbon lubricants, e. g., lubricating oils derived from coal products and synthetic oils, e. g., alkylene polymers (such as polymers of propylene, butylene, etc., and mixtures thereof), alkylene oxide type polymers, dicarboxylic acid esters, liquid esters of acids of phosphorous, alkylbenzene polymers, polymers of silicon, etc. Synthetic oils of the alkylene oxide polymers (e. g., propylene oxide polymers) and derivatives thereof, including alkylene oxide polymers prepared by polymerizing the alkylene oxides, e. g., propylene oxide, in the presence of water or alcohols, e. g., ethyl alcohol; esters of ethylene-oxide type polymers, e. g., acetylated propylene oxide polymers prepared by acetylating propylene oxide polymers containing hydroxyl groups; polyethers prepared from the alkylene glycols, e. g., ethylene glycol, etc.

The polymeric products prepared from the various alkylene oxides and alkylene glycols may be polyoxyalkylenediols or polyalkylene glycol derivatives; that is, the terminal hydroxy group can remain as such, or one or both of the terminal hydroxyl groups can be removed during the polymerization reaction by an esterification or etherification.

Synthetic oils of the dicarboxylic acid ester type include those which are prepared by esterifying such dicarboxylic acids as adipic acid, azelaic acid, suberic acid, sebacic acid, alkenyl succinic acid, fumaric acid, valeric acid, etc., with alcohols such as butyl alcohol, hexyl alcohol, 2-ethyl-hexyl alcohol, dodecyl alcohol, etc. Examples of dicarboxylic acid ester synthetic oils include dibutyladipate, dihexyladipate, di-2-ethylhexylsebacate, di-n-hexylfumaric polymer.

Synethic oils of the alkyl benzene type include those which are prepared by alkylating benzene (e. g., dodecyl benzene, tetradecyl benzene, etc.).

Synthetic oils of the type of polymers of silicon include the liquid esters of silicon and the polysiloxanes. The liquid esters of silicon and the polysiloxanes include those exemplified by tetraethylsilicate, tetraisopropylsilicate, tetra(methyl-2-butyl)silicate, tetra(4-methyl-2-penta)silicate, tetra(1-methoxy-2-propyl)silicate, hexyl(4-methyl-2-pentoxy)disiloxane, poly(methylsiloxane), poly(methylphenylsiloxane), etc.

The above base oils may be used individually as such, or in various combinations, wherever miscible or wherever made so by the use of mutual solvents.

When alkylene oxide type polymers or polymers of silicon are the base oils, it is preferable that the grease gel structure be formed first in a hydrocarbon solvent, e. g., toluene, after which the alkylene oxide type polymer, or the polymer of silicon, is added, and the solvent removed by distillation, or other means.

As thickening agents, the diamido acid salts of this invention may be used in lubricating oils in amounts sufficient to thicken the lubricating oil to the consistency of a grease. For this purpose, amounts from about 5% to about 50% can be used, with from about 10% to about 20% being preferred. In the preparation of more fluid grease compositions which are useful as air filter oils, about 2.5% of the thickening agents of this invention may be used in lubricating oils. On the other hand, in the preparation of brick-type greases, approximately 40% of the thickening agents of this invention will be required. All of the above percentages are by weight.

As previously stated, the thickening agents of this invention are prepared by reacting a monobasic acid with an alkylene diamine to form the corresponding acid amide, which amide is then reacted with a dibasic acid to form the corresponding diamido acid, which in turn, is reacted with a metal base substance to form the salt of the diamido acid.

More particularly, the thickening agents of this invention are prepared by reacting one mol of a monobasic acid (e. g., stearic acid) with one mol of an alkylene diamine (e. g., hexamethylenediamine) to form the corresponding acid amide. One mol of this acid amide is then reacted with one mol of a dibasic acid (e. g., sebacic acid) to form the corresponding diamido acid, after which one mol of the diamido acid is reacted with one mol of a metal base (e. g., sodium hydroxide) to form the desired metal salt of the diamido acid.

The following examples illustrate the preparation of the thickening agents of this invention.

EXAMPLE I, PREPARATION OF LITHIUM GREASE

A mixture of 284 grams (1 mol) of stearic acid and 60 grams (1 mol) of ethylene diamine was charged to a reaction vessel and heated with agitation at 170° C.–180° C. for a period sufficient to allow the theoretical quantity of water to be removed from the reaction mixture. 146 grams (1 mol) of adipic acid was added and the whole mixture was heated at 150° C.–220° C. for about two hours. The resulting product was a tan homogeneous solid.

A mixture of 30 grams of the above diamido acid and 170 grams of a California solvent-refined paraffin base mineral oil having a viscosity of 450 SSU at 100° F. was placed in a reaction vessel and heated, with agitation, at 450° F. until solution was complete. The mixture was then cooled to 200° F., after which 3.5 grams of hydrated lithium hydroxide was added. The whole mixture was then slowly heated with agitation to a temperature of 500° F. The resulting liquid product was poured into a pan to cool. The resulting gel was milled through an 80-mesh screen to form a smooth grease. This grease had an ASTM penetration of 278, and a dropping point of 376° F. In the boiling water test, the ball of grease was still intact after a period of 120 minutes in boiling water. In testing the water resistance of the greases, a ball of grease of about 5 grams weight was immersed in boiling, distilled water. The number of minutes before the ball was practically all disintegrated was noted.

EXAMPLE II, PREPARATION OF AN ALUMINUM GREASE

A mixture of 284 grams (1 mol) of stearic acid and 60 grams (1 mol) of ethylene diamine was heated at 170° C.–180° C. until amidation was complete. 200 grams (1 mol) of the dibasic acid was then added to the acid amide and the heating was continued at 150° C.–240° C. for an additional two hours.

The resulting amido acid (100 grams) was added to 550 grams of a synthetic oil, i. e., ethylhexylsebacate, and the mixture was heated, with agitation, until solution was complete. To this mixture was then added 27 grams of aluminum acetate dissolved in water. After the formation of the salt, the water was removed by heating the mixture with agitation to a temperature of 500° F., after which the liquid product was poured into a pan to cool. The resulting solid gel was milled through an 80-mesh screen to yield a very smooth homogeneous grease.

Table I, hereinbelow, presents additional data obtained with numerous exemplified grease thickening agents of this invention. These grease thickening agents were prepared as exemplified hereinabove. The thickening agents were dispersed in the base oils in amounts of 15% by weight. Except as noted, the base oils were California solvent-refined paraffinic base oils having viscosities of 51 SSU at 210° F. and 450 SSU at 100° F.

compositions of this invention may contain oxidation inhibitors (e. g., dihydroxyanthraquinones, metal organo dithiophosphates, etc.), rust inhibitors (e. g., metal petroleum sulfonates), lubricating agents (e. g., aromatic phosphates), color correctors, stringiness agents, etc.

I claim:

1. A grease composition comprising a major proportion of a lubricating oil, and, in an amount sufficient to thicken said lubricating oil to the consistency of a grease, a metal salt of an N-acyl, N'-acyl, alkylene diamine, wherein one acyl radical is derived from a fatty acid and the other acyl radical is derived from dicarboxylic acids containing from 2–8 carbon atoms.

2. A grease composition comprising at least 50%, by weight, of a mineral lubricating oil, and, in an amount sufficient to thicken said lubricating oil, an alkali metal salt of an N-acyl, N'-acyl, alkylene diamine, wherein one acyl radical is derived from a fatty acid and the other acyl radical is derived from dicarboxylic acids containing from 2–8 carbon atoms.

3. A grease composition comprising at least 50%, by weight, of a mineral oil of lubricating viscosity, and, in an amount sufficient to thicken said lubricating oil to the consistency of a grease, a diamido acid salt of the formula:

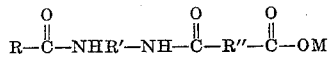

wherein R is selected from the group consisting of saturated, unsaturated, straight-chain and branched-chain aliphatic radicals containing from 10–22 carbon atoms; R' is selected from the group consisting of saturated, unsaturated, straight-chain, branched-chain and cyclic radicals having the formula $(CH_2)_x$, wherein $x$ is a number from 0–16; R'' is selected from the group consisting of saturated, unsaturated, straight-chain, branched-chain and cyclic hydrocarbon radicals containing from 1–8 carbon atoms, and M is an alkali metal.

4. A grease composition comprising at least 50%, by

*Table I*

| | Monobasic acid | Diamine | Dibasic acid | Metal | Penetration | | Dropping point, ° F. | Resistance to boiling water, minutes |
|---|---|---|---|---|---|---|---|---|
| | | | | | Unworked | After 60 strokes | | |
| 1 | Lauric | Ethylene | Adipic | Sodium | 224 | 278 | 500+ | |
| 2 | Stearic | do | do | Lithium | 220 | 278 | 376 | 120+ |
| 3 | do | do | do | Sodium | 191 | 256 | 342 / 503 | |
| 4 | do | Hexymethylene | do | do | 175 | 233 | 433 | 120+ |
| 5 | do | do | do | Lithium | | | | 120+ |
| 6 | do | p-Xylylene | do | Sodium | | 273 | 403 | |
| 7 | do | Ethylene | do | Calcium | | 319 | 191 | 120+ |
| 8 | do | p-Xylylene | Terephthalic | Sodium | | 345 | 345 | |

An advantage of the thickening agents of the present invention is that it is possible to use less of the thickening agents disclosed herein than the metal soap thickening agents heretofore used or numerous other thickening agents heretofore available. For example, it is possible to obtain comparable thickened greases by using approximately 4–5% less of the thickening agents of this invention than is necessary with normal metal soap thickening agents.

Besides being excellent thickening agents for greases, the diamido acid soaps of this invention are suitable as improving agents in lubricating oils, in pigment manufacture, in dusting powders, for imparting greater waterproofness in such materials as leather, textiles, wood and other fibrous or porous materials, etc. Also, the thickening agents herein are useful as gelling agents for plastigels.

In addition to the agents noted herein, the grease weight, of a lubricating oil, and, from 5% to 50%, by weight, of a diamido acid salt of the formula:

wherein R is selected from the group consisting of saturated, unsaturated, straight-chain and branched-chain aliphatic radicals containing from 10–22 carbon atoms; R' is selected from the group consisting of saturated, unsaturated, straight-chain, branched-chain and cyclic radicals having the formula $(CH_2)_x$, wherein $x$ is a number from 0–16; R'' is selected from the group consisting of saturated, unsaturated, straight-chain, branched-chain and cyclic hydrocarbon radicals containing from 1–8 carbon atoms, M is a metal, and $a$ is a number equal to the valence of said metal.

5. A grease composition comprising at least 50%, by weight, of a lubricating oil, and, in an amount sufficient to thicken said oil to the consistency of a grease, a diamido acid salt of the formula:

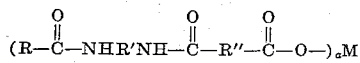

wherein R is selected from the group consisting of straight-chain, branched-chain, saturated and unsaturated aliphatic radicals containing from 12 to 18 carbon atoms, R' is an alkylene radical having from 4–10 carbon atoms; R'' is a straight-chain, hydrocarbon radical having from 2–6 carbon atoms, M is a metal, and $a$ is a number equal to the valence of said metal.

6. A grease composition comprising at least 50% by weight, of a mineral lubricating oil, and, in an amount sufficient to thicken said lubricating oil to the consistency of a grease, a monovalent metal salt of a diamido acid of the formula:

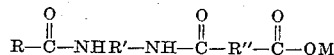

wherein R is selected from the group consisting of straight-chain, branched-chain, saturated and unsaturated aliphatic radicals containing from 12 to 18 carbon atoms, R' is an alkylene radical having from 4–10 carbon atoms; R'' is a straight-chain, hydrocarbon radical having from 2–6 carbon atoms, and M is an alkali metal.

7. A grease composition comprising at least 50%, by weight, of a mineral lubricating oil, and, in an amount sufficient to thicken said lubricating oil to the consistency of a grease, a divalent salt of a diamido acid of the formula:

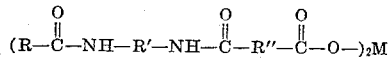

wherein R is selected from the group consisting of straight-chain, branched-chain, saturated and unsaturated aliphatic radicals containing from 12 to 18 carbon atoms, R' is an alkylene radical having from 4–10 carbon atoms; R'' is a straight-chain, hydrocarbon radical having from 2–6 carbon atoms, and M is an alkaline earth metal.

8. A grease composition comprising at least 50%, by weight, of a mineral lubricating oil, and from 10% to 20%, by weight, of a monovalent metal salt of a diamido acid of the formula:

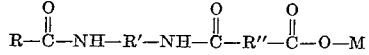

wherein R is selected from the group consisting of saturated, unsaturated, straight-chain and branched-chain aliphatic radicals containing from 10–22 carbon atoms; R' is selected from the group consisting of saturated, unsaturated, straight-chain, branched-chain and cyclic radicals having the formula $(CH_2)_x$, wherein $x$ is a number from 0–16; R'' is selected from the group consisting of saturated, unsaturated, straight-chain, branched-chain and cyclic hydrocarbon radicals containing from 1–8 carbon atoms, and M is an alkali metal.

9. A grease composition comprising a major proportion of a mineral lubricating oil, and from 5% to 50%, by weight, of a sodium salt of a diamido acid of the formula:

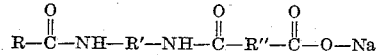

wherein R is selected from the group consisting of saturated, unsaturated, straight-chain and branched-chain aliphatic radicals containing from 10–22 carbon atoms; R' is selected from the group consisting of saturated, unsaturated, straight-chain, branched-chain and cyclic radicals having the formula $(CH_2)_x$, wherein $x$ is a number from 0–16; and R'' is selected from the group consisting of saturated, unsaturated, straight-chain, branched-chain and cyclic hydrocarbon radicals containing from 1–8 carbon atoms.

10. A grease composition comprising at least 50%, by weight, of a mineral lubricating oil, and from 10% to 20%, by weight, of a divalent metal salt of a diamido acid of the formula:

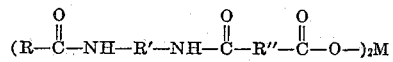

wherein R is selected from the group consisting of saturated, unsaturated, straight-chain and branched-chain aliphatic radicals containing from 10–22 carbon atoms; R' is selected from the group consisting of saturated, unsaturated, straight-chain, branched-chain and cyclic radicals having the formula $(CH_2)_x$, wherein $x$ is a number from 0–16; R'' is selected from the group consisting of saturated, unsaturated, straight-chain, branched-chain and cyclic hydrocarbon radicals containing from 1–8 carbon atoms, and M is an alkaline earth metal.

11. A grease composition comprising at least 50%, by weight, of a mineral lubricating oil, and from 10% to 20%, by weight, of a diamido acid salt of the formula:

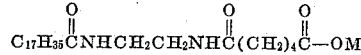

wherein M is a metal.

12. A grease composition comprising at least 50%, by weight, of a mineral lubricating oil, and from 10% to 20%, by weight, of a diamido acid salt of the formula:

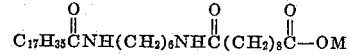

wherein M is a metal.

13. A grease composition comprising at least 50%, by weight, of a mineral lubricating oil, and from 10% to 20%, by weight, of a diamido acid salt of the formula:

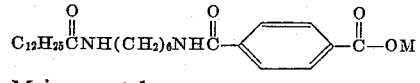

wherein M is a metal.

14. A grease composition comprising at least 50%, by weight, of a lubricating oil, and from 10% to 20%, by weight, of a diamido acid salt of the formula:

15. A grease composition comprising at least 50%, by weight, of a lubricating oil, and from 10% to 20%, by weight, of a diamido acid salt of the formula:

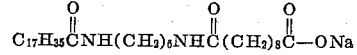

16. A grease composition comprising at least 50%, by weight, of a lubricating oil, and from 10% to 20%, by weight, of a diamido acid salt of the formula:

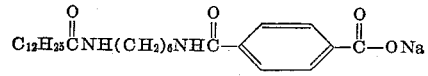

References Cited in the file of this patent

UNITED STATES PATENTS

| Number | Name | Date |
|---|---|---|
| 2,239,706 | Epstein et al. | Apr. 29, 1941 |
| 2,409,275 | Harris | Oct. 15, 1946 |
| 2,568,876 | White et al. | Sept. 25, 1951 |
| 2,604,449 | Bryant et al. | July 22, 1952 |
| 2,609,380 | Goldstein et al. | Sept. 2, 1952 |
| 2,609,381 | Goldstein et al. | Sept. 2, 1952 |
| 2,638,449 | White et al. | May 12, 1953 |
| 2,638,450 | White et al. | May 12, 1953 |
| 2,752,312 | Dixon | June 26, 1956 |
| 2,756,213 | Dixon | July 24, 1956 |